(12) United States Patent
Miller et al.

(10) Patent No.: US 6,485,852 B1
(45) Date of Patent: Nov. 26, 2002

(54) INTEGRATED FUEL REFORMATION AND THERMAL MANAGEMENT SYSTEM FOR SOLID OXIDE FUEL CELL SYSTEMS

(75) Inventors: Carl Elmer Miller, Millington, MI (US); Bruno Depreter, Clarkston, MI (US); Haskell Simpkins, Grand Blanc, MI (US); Jean Joseph Botti, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/479,165

(22) Filed: Jan. 7, 2000

(51) Int. Cl.[7] .............................. H01M 8/06; B01J 19/24
(52) U.S. Cl. ........................ 429/17; 429/19; 422/198; 422/240
(58) Field of Search .................. 429/17, 19, 20, 429/26; 422/198, 240

(56) References Cited

U.S. PATENT DOCUMENTS 4,898,792 A * 2/1990 Singh et al. .................. 429/19
4,973,529 A * 11/1990 Grasso et al. ............. 429/19 X
5,250,368 A * 10/1993 Gorka et al. .................. 429/17

* cited by examiner

Primary Examiner—Stephen Kalafut
(74) Attorney, Agent, or Firm—Vincent A. Cichosz (57) ABSTRACT

A compact integrated thermal management and fuel reformation system and method includes a thermally insulated wall forming an envelope having an interior chamber housing, a solid oxide fuel cell stack and a mixed mode heat exchanger. A recuperator having interior walls that are color graded to provide temperature zones effecting a positive temperature gradient in the direction of the solid oxide fuel cell stack is disposed within the chamber and close coupled to the fuel cell stack for absorbing radiation therefrom. The recuperator further heats the partially preheated oxidant gas and partially or fully reforms incoming fuel gas. Manifolds having oxidant and fuel channels for conducting reformed fuel and heated oxidant from the recuperator to fuel cell oxidant and fuel inlets are arranged to maximize fuel flow at the portions of each fuel cell adjacent the recuperator and to maximize oxidant flow near central portions of each fuel cell. A method for providing a tailored anode fuel stream is also provided.

40 Claims, 7 Drawing Sheets

LOCATION WITHIN
MIXED MODE HEAT EXCHANGER

INTEGRATED FUEL REFORMATION AND THERMAL MANAGEMENT SYSTEM FOR SOLID OXIDE FUEL CELL SYSTEMS

TECHNICAL FIELD

The invention relates generally to solid oxide fuel cell systems and particularly to a compact thermal management and fuel reformation system for solid oxide fuel cell systems suitable for use in numerous applications including transportation applications.

BACKGROUND OF THE INVENTION

Fuel cells are electrochemical devices that convert chemical potential energy into usable electricity and heat without combustion as an intermediate step. Fuel cells are similar to batteries in that both produce a DC current by using an electrochemical process. Two electrodes, an anode and a cathode, are separated by an electrolyte. Like batteries, fuel cells are combined into groups, called stacks, to obtain a usable voltage and power output. Unlike batteries, however, fuel cells do not release energy stored in the cell, running down when battery energy is gone. Instead, they convert the energy typically in a hydrogen-rich fuel directly into electricity and operate as long as they are supplied with fuel and oxidant. Fuel cells emit almost none of the sulfur and nitrogen compounds released by conventional combustion of gasoline or diesel fuel, and can utilize a wide variety of fuels: natural gas, coal-derived gas, landfill gas, biogas, alcohols, gasoline, or diesel fuel oil.

In transportation applications, SOFC power generation systems are expected to provide a higher level of efficiency than conventional power generators which employ heat engines such as gas turbines and diesel engines that are subject to Carnot cycle efficiency limits. Therefore, use of SOFC systems as power generators in vehicle applications is expected to contribute to efficient utilization of resources and to a relative decrease in the level of $CO_2$ emissions and an extremely low level of $NO_x$ emissions. However, SOFC systems suitable for use in transportation applications require a very compact size as well as efficient thermal management. Thermal management must be accomplished whereby the outer surface of the fuel cell envelope is typically maintained below 45° C. while the temperature inside the stack is about 700° C. to about 950° C.

As with fuel cells generally, very hot solid oxide fuel cells (SOFC) having high electrical conductivity, are used to convert chemical potential energy in reactant gases into electrical energy. In the SOFC, two porous electrodes (anode and cathode) are bonded to an oxide ceramic electrolyte (typically, yttria stabilized zirconia, $ZrO_2$—$Y_2O_3$) disposed between them to form a selectively ionic permeable barrier. Molecular reactants cannot pass through the barrier, but oxygen ions ($O^{2-}$) diffuse through the solid oxide lattice. The electrodes are typically formed of electrically conductive metallic or semiconducting ceramic powders, plates or sheets that are porous to fuel and oxygen molecules. Manifolds are employed to supply fuel (typically hydrogen, carbon monoxide, or simple hydrocarbon) to the anode and oxygen-containing gas to the cathode. The fuel at the anode catalyst/electrolyte interface forms cations that react with oxygen ions diffusing through the solid oxide electrolyte to the anode. The oxygen-containing gas (typically air) supplied to the cathode layer converts oxygen molecules into oxygen ions at the cathode/electrolyte interface. The oxygen ions formed at the cathode diffuse, combining with the cations to generate a usable electric current and a reaction product that must be removed from the cell (i.e., fuel cell waste stream). Typical reactions taking place at the anode (fuel electrode) triple points are:

$$H_2 + \tfrac{1}{2}O^{2-} \rightarrow H_2O + 2e^-$$

$$CO + \tfrac{1}{2}O^{2-} \rightarrow CO_2 + 2e^-$$

The reaction occurring at the cathode (oxygen electrode) triple points is:

$$\tfrac{1}{2}O_2 + 2e^- \rightarrow O^{2-}$$

The overall system reactions in the cell are:

$$\tfrac{1}{2}O_2 + H_2 \rightarrow H_2O$$

$$\tfrac{1}{2}O_2 + CO \rightarrow CO_2$$

The consumption of the fuel/oxidant ions produces electrical power where the electromotive force is defined by the Nernst equation:

$$E = E^\circ + \frac{RT}{2F} \ln\left(P_{H_2} P_{O_2}^{1/2} / P_{H_2O}\right)$$

SOFC fuel stacks typically operate in the relatively high temperature range of about 700° C. to about 950° C. Reactant gases are preheated, typically by heat exchangers, to prevent the gases from cooling the stack below the optimum operating temperature. The heat exchangers, whether discrete or part of the total SOFC furnace, can be quite bulky, complex and expensive. In a traditional heat exchanger design, hot exhaust gas from the electrolyte plate is fed to the heat exchanger, and preheated reactant gas is received from the heat exchanger via costly insulated alloy piping. The heat exchanger and piping also require considerable installation and maintenance expense. High temperature piping and heat exchangers are costly from the standpoint of heat loss as well. The piping and heat exchanger have considerable surface area where heat may be exchanged with the atmosphere. This heat is thus unavailable to preheat incoming gases.

A similar situation exists for the fuel processing system in a SOFC. Partially reformed fuel gas (i.e., vaporized gasoline at a near stoichiometric fuel/air ratio) is typically reprocessed or reformed to convert some of the reaction products into usable hydrocarbon feedstock. Reformation of hydrocarbons often is endothermic and often requires temperatures in excess of about 750° C. to achieve complete conversion of the hydrocarbon feed. Most SOFC systems must burn a portion of the fuel for the purpose of supplying the heat of reaction for the reformation process. The high temperature reformer unit and associated piping also have considerable surface area subject to heat loss. Such designs are very bulky, expensive and have limited ability for passive thermal feedback control.

Simple laminate SOFC stack enclosures of stainless steel and ceramic insulation fibers with internal and/or external heat exchangers for fuel and oxidant streams have been developed. For example, U.S. Pat. No. 5,340,664 to Hartvigsen discloses an insulative enclosure housing an SOFC system and heat exchangers used to capture and remove thermal energy from the fuel cell system. The heat exchangers include a screw culvert heat exchanger and a plate fin heat exchanger.

U.S. Pat. No. 5,366,819 to Hartvigsen et al. discloses a reformer located inside a fuel cell stack furnace for breaking down hydrocarbon feedstock into fuel for the fuel cells. Heat recuperated from the oxidation process in the fuel cell stack is used to support the endothermic reformation reaction in the reactor beds of the reformer. Heat transfers to incrementally shielded packed beds of the reformer by radiation from the stack and furnace wall and by forced convection from the exhausting airflow exiting the stack furnace. Temperature gradients in the reformer are controlled by incremented radiation shielding apparatus and by counterflow heat exchange. The counterflow heat exchanger forms the inner wall of the stack furnace and comprises a corrugated fin type heat exchanger captured between two layers or walls of high temperature sheet metal.

What is needed in the art is a compact, efficient SOFC thermal management and fuel reformation system. What is further needed in the art is a compact, efficient SOFC thermal management and fuel reformation system suitable for transportation applications. What is further needed in the art is a compact, thermally efficient fuel reformation system that can be adjusted in accordance with the SOFC stack design and reaction requirements of different fuel feedstock.

SUMMARY OF THE INVENTION

The present invention provides a compact integrated thermal management and fuel reformation system for SOFC systems and is particularly advantageous for SOFC systems used in transportation applications. In the present system, a SOFC stack comprising a plurality of solid oxide bicells is disposed within an interior chamber of an envelope structure formed by a thermally insulative wall.

A recuperator having dual function as a radiation-dominant heat exchanger and fuel reformer is disposed within the envelope in fluid and thermal communication with and close-coupled to the SOFC stack. The recuperator has interior walls that are color graded to effect a plurality of temperature zones forming a positive temperature gradient in the direction of said solid oxide fuel cell stack.

A mixed mode heat exchanger is disposed between the recuperator and the insulative wall in fluid communication with an oxidant source and the recuperator. Together, the insulative wall, the mixed mode heat exchanger, and the recuperator form an "adiabatic wall" such that the system functions substantially without loss or gain of heat to the dictates of the power loads.

During operation of the system, oxidant (typically air) enters the mixed mode heat exchanger through an oxidant inlet and is partially preheated therein. The partially preheated oxidant flows through a passage to the recuperator where it is further heated. Fuel gas is supplied to a selected recuperator zone and partially or fully reformed therein to provide a tailored anode fuel stream for the SOFC.

Manifolds comprising oxidant and fuel channels for passing preheated oxidant and reformed fuel from the recuperator to the SOFC oxidant and fuel inlets are arranged so as to effect increased fuel flow in peripheral portions of each fuel cell adjacent the recuperator. The channels are further arranged so as to effect increased oxidant flow toward the center of each fuel cell for cooling the SOFC stack.

The present system provides conversion of fuel (such as gasoline) to electricity at high efficiency using a compact envelope whose components have dual roles. The present system simplifies heat management by utilizing passive thermal feedback and ameliorates differential heat distribution within the fuel cell stack. Further, the present system provides a vastly superior and compact device as compared with discrete component SOFC systems or integrated screw culvert or fin-type heat exchangers disposed within an SOFC furnace.

The smaller volume of the present SOFC system is particularly useful for transportation applications. For example, the present system is particularly advantageous for use in power generation systems comprising hybrid electric powertrains such as those disclosed in commonly assigned U.S. Pat. No. 6,230,494 entitled "Power Generation System and Method" and in commonly assigned, co-pending U.S. patent application Ser. No. 09/241,239 entitled "Power Generation System and Method With Exhaust Side Solid Oxide Fuel Cell", and commonly assigned, co-pending U.S. patent application Ser. No. 09/294,679 entitled "Power Generation System and Method", all of which are hereby incorporated by reference herein in their entireties.

The present tailored anode fuel stream results in less stress on stack components from fast, large thermal excursions and balances thermal management across the face of each anode. Reformation is selectively endothermic or exothermic based upon the power demand to the SOFC stack, thus controlling heat flow into and out of the SOFC stack and inhibiting heat flow from within the system to the outside.

Further, the reformer may be employed as a pyrolysis unit to quickly bring the SOFC stack up to operational temperatures (about 700 to about 950° C.) from start-up (about 550° C.) by thermally catalyzing the cracking of gasoline, producing a nearly pure hydrogen fuel stream.

In a preferred embodiment, the present system and method provide the further advantage of eliminating vertical temperature gradient in the SOFC stack by utilizing segregated specialized anode fuel streams for selected SOFC stack sections. In a more preferred embodiment, segregated specialized anode fuel streams are employed in combination with reflective surfaces disposed upon selected interior portions of the chamber wall and radiant energy absorbing surfaces of the SOFC stack end sections. Such reflective and absorbent surfaces are arranged so as to reflect radiant energy emitted from warmer, center stack portions to cooler end stack sections. In combination, the present features effect thermal management via passive feedback control of photons. The system may be tailored for particular SOFC stack design and fuel requirements.

These and other features and advantages of the present invention will be apparent from the following brief description of the drawings, description of the preferred embodiment, and appended claims and drawings.

BRIEF DESCRIPTION OF THE DRAWINGS

Referring now to the drawings, which are meant to be exemplary, not limiting, and wherein like elements are numbered alike in the several Figures.

DESCRIPTION OF THE PREFERRED EMBODIMENT

Figure 1:
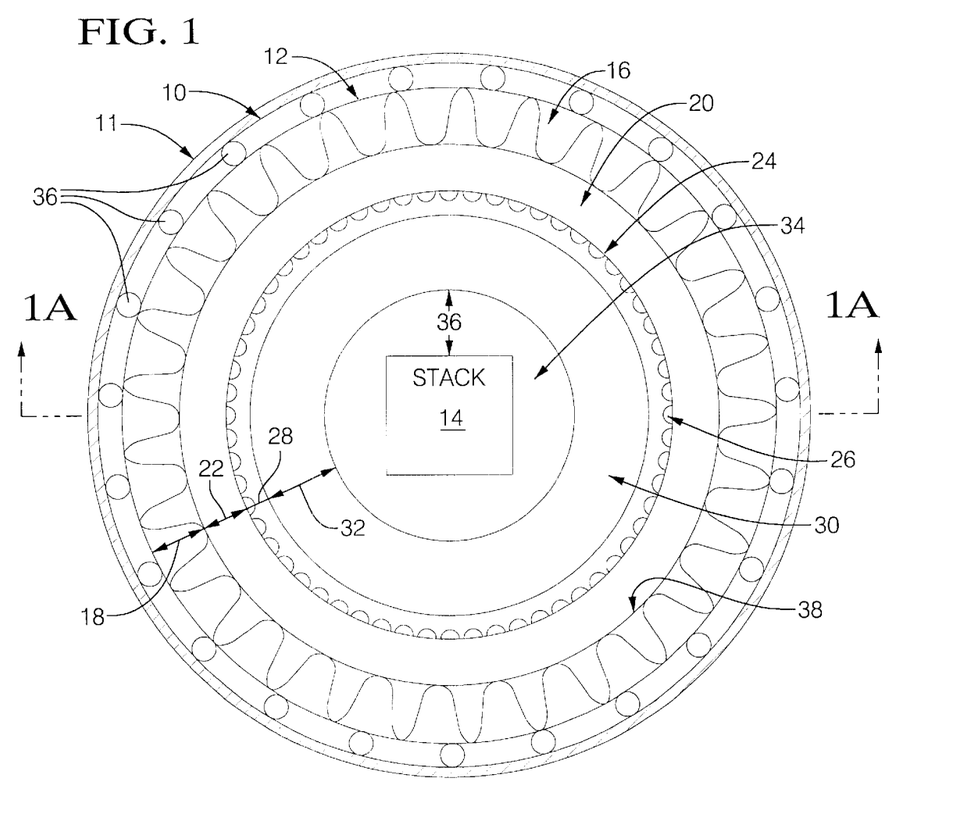
FIG. 1 is a schematic plan view of a preferred embodiment of the present fuel reformation and thermal management system.
Figure 2:
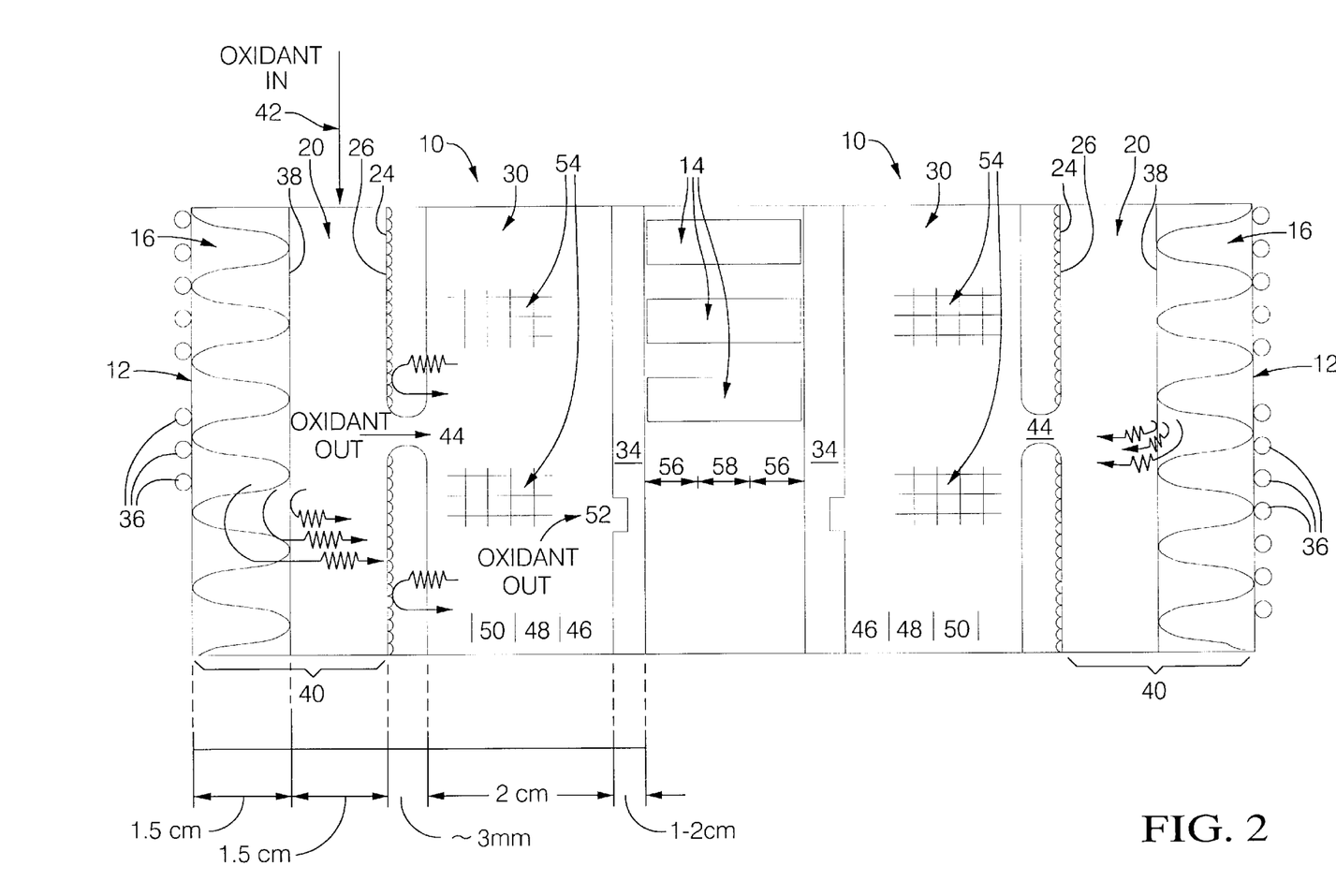
FIG. 2 is a cross-sectional view of the embodiment of FIG. 1, viewed along the line 1A–1A.

Referring now to FIGS. 1 and 2, FIG. 1 provides a schematic plan view of a preferred embodiment of the present system, and FIG. 2 provides a partial cross-sectional view of the embodiment of FIG. 1 viewed along the line 1A—1A. The present system 10 includes insulative outer wall 12 which defines an envelope, preferably cylindrical, having an interior chamber (not numbered) housing a SOFC stack 14 comprising a plurality of solid oxide fuel cells having oxidant and fuel inlets and supplemental heat/air exchange ducts (not shown) and arranged to permit fluid flow of incoming oxidant and fuel gases therebetween. A fraction of the SOFC fuel exhaust is preferably recirculated to recuperator 30 (connection not shown). The wall 12 forming the envelope structure may be formed from a multi-layer stainless steel, such as 409 stainless steel or equivalent. A multiple layer super plastic forming process, such as used in the aircraft industry, or equivalent, may be employed to form the multi-layer stainless steel wall 12 with minimal heat shorts.

An insulative layer, such as insulative layer 16, may be disposed along the interior of wall 12, preferably at a thickness 18 of about 1.5 centimeters. An additional insulative layer or plurality of layers may be provided within or external to the envelope structure, if desired. Materials suitable for forming the insulative layers may be any materials suitable for containing thermal energy, including, but not limited to, ceramic materials having a high void fraction. Additionally, a silica aerogel modified with reflective nanophase particles or fibers, for example fume soot carbon (carbon having a maximum dimension of about $0.1\mu$ or less), or other infrared photon reflectors may be employed. Such silica aerogel achieve appreciable infrared (IR) reflectance (as indicated by curved jagged arrows in FIG. 2) in the direction of the mixed mode heat exchanger 20. Insulative layer 16 serves to further isolate heat within the envelope structure enhancing maintenance of stack temperature. This is particularly useful because maximum temperature decreases of about 300 to about 500° C. are required within 24 hours of the SOFC stack 14 shutdown.

Further, an intumescent polymeric fire shield 11 (shown in FIG. 1) may be employed to surround the outer surface of outer wall 12, such that when the thermoplastic intumescent material is exposed to fire, it expands to form a non-combustible sponge fire shield. For example, material such as that disclosed in U.S. Pat. No. 5,834,535 to Abu-Isa et al. for "Moldable Intumescent Polyethylene and Chlorinated Polyethylene Composition," which is hereby incorporated by reference herein in its entirety, may be employed as the fire shield.

Mixed mode heat exchanger 20 is disposed within the interior chamber, preferably adjacent the insulative layer 16. The interior wall 24 of the mixed mode heat exchanger 20 has a preferred width 28 of about 3 millimeters and preferably includes a reflective layer 26 disposed thereon for reflecting thermal energy (shown as curved jagged arrows in FIG. 2) away from outer wall 12. In a more preferred embodiment, the mixed mode heat exchanger 20 substantially surrounds the recuperator 30. Preferably, mixed mode heat exchanger 20 has a width 22 of about 1.5 centimeters.

Recuperator 30, preferably having a thickness 32 of about 2 centimeters, is disposed within the interior chamber in fluid communication with the mixed mode heat exchanger 20 and is close-coupled to the SOFC stack 14. In a preferred embodiment, the recuperator 30 is disposed between the mixed mode heat exchanger 20 and the SOFC stack 14 and substantially surrounds the SOFC stack 14. Channel 34 for passage of fluid and heat exchange between the SOFC stack 14 and the recuperator 30 is disposed between and defined by the recuperator 30 and the SOFC stack 14. Preferably, channel 34 has a width 36 of about 1 to about 2 centimeters and communicates with fuel inlets of individual cells.

In certain applications, particularly mobile applications, recirculated engine coolant provides a final coolant stage, whereby the outer surface 12 of the envelope structure is maintained at a temperature of about 40° C. In combination, the insulative properties of the insulative layer 16 and infrared reflectance (indicated by curved jagged arrows in FIG. 2) in the direction of mixed mode heat exchanger 20 serve to maintain the inner wall 38 at about 100° C. during operation of the system and to inhibit temperature decrease within the envelope during system shut down. Section 40 (indicated in FIG. 2) of the adiabatic wall is preferably formed utilizing super plastic forming techniques to provide a compact device with minimal heat shorts.

Heat exchange mechanisms for heat transfers from one body to another differ greatly with temperature. Heat transfer via conduction or convection is affected primarily by temperature difference rather than temperature value in small dimensional ducts. At low temperatures, conduction or convection heat exchange mechanisms dominate heat transfer, while at high temperatures, radiation becomes the primary heat transfer mechanism in accordance with the Stefan-Boltzman Law of radiation, which states that as the temperature of a heat source is increased, the radiant output increases to the fourth power of its temperature, $$W \approx \epsilon \sigma T^4,$$

wherein $\epsilon$ is the emissivity depending on the material and the temperature, $\sigma$ is the Stefan-Boltzman constant ($5.6 \times 10^{-8}$ W/m$^2$K$^4$), and T is the temperature of the heat source. For two large parallel opaque surfaces of emissivity $\epsilon$ at temperatures $T_1$ and $T_2$, the amount of radiant power transferred is $$W = \epsilon \sigma T^3 \Delta T$$

where the temperature difference $\Delta T$ (where $\Delta T = T_1 - T_2$) is small compared to the mean temperature T $$T = (T_1 + T_2)/2.$$

Radiant heat transfer for this case varies with $T^3$ while heat transfer for conduction and convection components increase only in direct proportion with the temperature changes. Thus, as the temperature of a heat source is increased, a much greater percentage of the total energy output is converted into radiant energy. The Draper point, where radiation begins to dominate heat transfer to gas mixtures comprising molecules with permanent dipole moments, is about 500 to about 550° C. (viz a temperature where the object "glows" visibly).

The present mixed mode heat exchanger 20 is a "low" temperature heat exchanger effecting heat exchange by conduction, convection and some radiation transfer. The most efficient heat transfer mechanism for the mixed mode heat exchanger 20 depends on the inner temperature and space velocity of the oxidant. Typically, about 80% of the heat transfer in the mixed mode heat exchanger 20 is via conduction, with about 20% of the heat transfer occurring via radiation (this is dependant on space velocity and degree of mixing).

Reflective layer 26 provides an IR reflectance for radiation above about 1 micron in the direction of the recuperator 30 and the SOFC stack 14. For example, a zirconia reflective layer 26 may be provided to reflect a large fraction of black body energy back to the recuperator 30 and the SOFC stack 14. Preferably, the reflective layer 26 further serves to keep the inner wall surface 24 of the mixed mode heat exchanger 20 at a "cooler" temperature (about 300° C. is desirable).

During system operation, oxidant stream 42 (shown in FIG. 2) enters the mixed mode heat exchanger 20 through an oxidant inlet (not shown) at a temperature of about 25° C., is partially heated within the mixed mode heat exchanger 20, and flows through passage 44 to the recuperator 30, entering the recuperator 30 at a temperature of about 300° C. Mixed mode heat exchanger 20 thus partially preheats incoming oxidant used for partial oxidation, while providing an additional buffer for the SOFC stack 14 from the outer wall 12.

Figure 3:
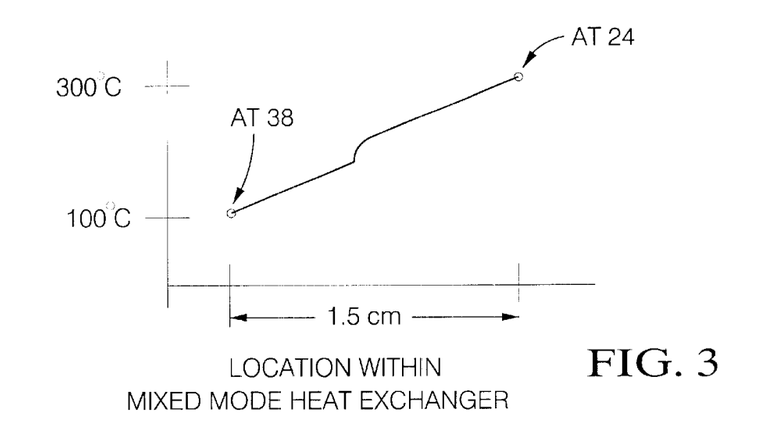
FIG. 3 is a temperature gradient profile for the mixed mode heat exchanger of FIG. 2.

An optimal temperature gradient profile for the mixed mode heat exchanger 20 is provided in FIG. 3, wherein the wall 38 is about 100° C. and a positive temperature gradient occurs along the width of the mixed mode heat exchanger 20 up to a temperature of about 300° C. at the wall 24.

A white to medium gray to dark color gradient is provided along interior walls of recuperator 30 to effect a positive temperature gradient in the direction of the SOFC stack 14. "Color sensitivity" is another characteristic of infrared radiation that is related to source temperature and wavelength. The general rule is the higher the temperature of the source, the higher the rate of heat absorption by darker colors. For example, water and glass (which are colorless) are virtually transparent to short-wave visible radiation, but are very strong absorbers of longer wave radiation above 2 microns. In the present system, the recuperator 30 is arranged to utilize the color sensitivity of infrared radiation to tailor the heat exchange mechanisms and reformation processes.

Real materials almost never comply with the laws of blackbody spectral emittance (i.e., do not exhibit blackbody spectral emittance curves according to Planck's law) over an extended wavelength interval, although they may approach the blackbody behavior in certain spectral regions. For instance, white paint which appears perfectly white in the visible wavelength becomes "gray" at about $2\mu$, and beyond $3\mu$ wavelength it is almost "black." Thus, "color" as used herein refers to the peak blackbody intensity wavelength of about 2.5 to about 3.2 microns occurring for a blackbody of about 725 to about 800° C.

In the embodiment shown in FIG. 2, the recuperator 30 is color graded to provide dark, medium and light channels (or zones) 46, 48, and 50, respectively. In a preferred embodiment, the recuperator 30 comprises a multizoned extruded ceramic monolith. Black channels 46 are disposed adjacent the SOFC stack 14 to absorb substantially all the SOFC stack 14 radiation. Preferably, the center portion of the black channel 46 is darker than the black channel portions adjacent each end of the SOFC stack 14. Medium gray channels 48 are provided so as to be a "good" admitter of radiation to the oxidant. Bright white channels 50 are provided to reflect radiation back toward the recuperator 30 and, during shutdown, the SOFC stack 14. This arrangement provides the further advantage of enhancing maintenance of the SOFC stack 14 temperature, which in turn enhances fast start-up after a period of shut down.

Inorganic pigments stable to high temperature and reducing or oxidizing environments are used to color channel zones 46, 48, and 50. In commercial production, inorganic "salts" are separately introduced into the ceramic slurry and the resultant color coded co-extruded monolith structure is formed having a color spectrum comprising bright white (no pigment or impurities) to gray (some pigments) to black (large amounts of pigments). Advantageously, the present system achieves a compact, integral thermal gradient, without the use of discrete shielding structures, thus enhancing the system's ability to meet reduced size requirements as desired, for example, in transportation systems employing SOFCs.

Ceramic blankets 54 are strategically disposed upon the recuperator 30 to inhibit heat loss during system operation and further enhance maintenance of the SOFC fuel cell stack 14 temperature during system shut down. In one embodiment, as shown in FIG. 2, the ceramic blankets 54 are disposed at top and bottom portions of the recuperator 30. The multiple chambers of ceramic blankets are made from shock resistant ceramic material such as, but not limited to, cordierite, mullite, silicon carbide, or a combination thereof.

Figure 4:
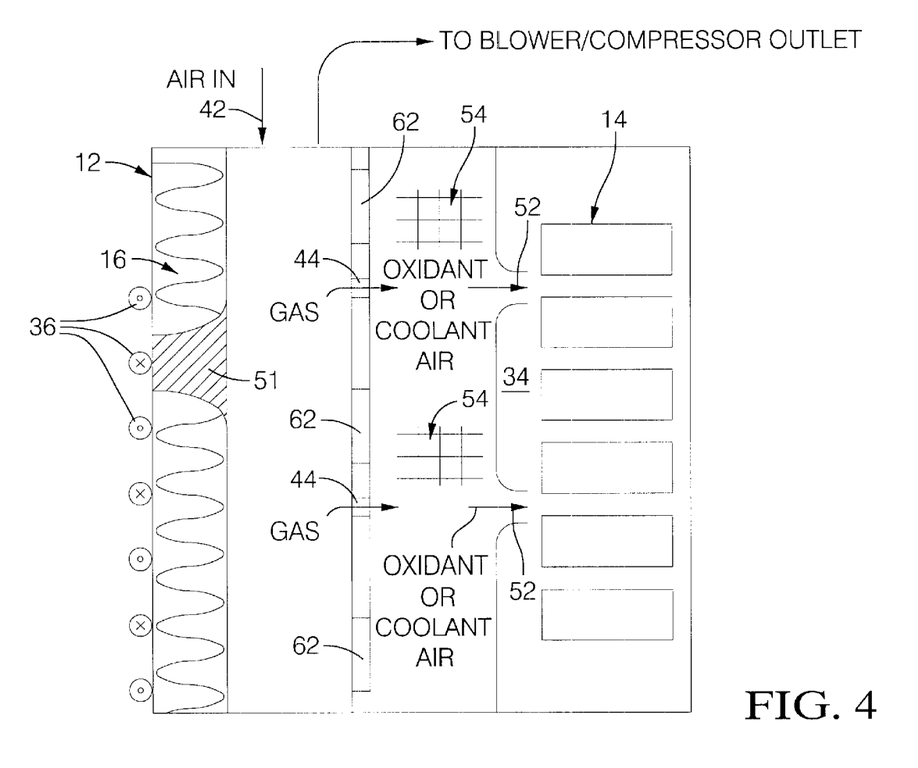
FIG. 4 is a cross-sectional view of a portion of the embodiment shown in FIG. 2.

As shown in FIG. 4, ceramic fiber gaskets 62 support the recuperator 30 while absorbing shock and isolating the recuperator 30 from undesirable thermal pathways by serving as seals and providing a buffer for handling thermal expansion differences. A minimal number of struts 51 minimize heat shorts to the outer wall 12. A minimum number of gas passages 44 are provided to further minimize heat shorts to the outer wall 12.

During system operation, partially preheated oxidant gas enters the recuperator 30 through passage 44 at a temperature of about 300° C. and is further heated through radiation transfer in the recuperator 30 to about 700° C. Heated oxidant flows through passage 52 to manifold 64 having oxidant and fuel manifold channels 66 and 68, respectively (shown in FIG. 5) to appropriate SOFC electrodes (not shown). Channel 34 provides a conduit for a fraction of the excess (waste) thermal energy from the fuel cell stack 14 back to the close-coupled recuperator. This thermal energy is transferred to oxidant in the recuperator 30 via molecular-dipole coupling, further enhancing system efficiency. The remainder of the anode waste stream is expelled to the atmosphere (not shown). Further, the SOFC stack 14 exhaust waste stream may be recirculated to recuperator 30 (passage not shown). The oxidant stream comprises predominately air (95–50%), with the remainder comprising waste stream from the SOFC stack 14. The SOFC waste stream is rich in $CO_2$ and $H_2O$ with some CO, having very large dipole moment and thus providing good coupling. $CO_2$ and $H_2O$ capture is achieved via vibration-rotational energy transformations from the monolith walls of the recuperator 30. This radiant energy is conferred rapidly to $N_2$ and $O_2$ via collisions with water and carbon dioxide molecules. As indicated in FIG. 2, the hottest zone 56 within the SOFC stack 14 is adjacent the recuperator 30 and the highest zone of oxidant flow 58 is in that portion of the fuel cell stack 14 that is farthest from the recuperator 30. The depleted oxidant stream (about 850° C.) passes from the fuel cell stack 14 to an exhaust passage (not shown). In the present system, only about 25% excess thermal energy is lost through the exhaust, with about 75% of the stack thermal energy returned to the recuperator 30. Table 1 summarizes the heat flow removal modes accomplished by the present system.

TABLE 1

Desirable Engineering Features

| LOCATION OF "CHANNELS" OR "DUCTS" | THERMAL RADIATION MECHANISM | | | THERMAL CONDUCTION MECHANISM |
|---|---|---|---|---|
| | To Oxidant | To Recuperator | To Stack | |
| Near Exterior Wall to Recuperator | Large* | Dominant | | Small |
| Near Center to Oxidant | Moderate* | None | | Modest |
| Auxiliary Ducts In Stack | None | None | Large | Small |

*Transfer to $CO/CO_2/H_2O$ via IR photon absorption

If desired, the oxidant gas may contain higher levels of other constituents such as $CO_2$, lesser amounts of CO and some $H_2O$, $CH_4$, etc. by mixing outside air at a blower outlet with anode exhaust at a ratio of about 10 parts air to a few parts exhaust gas. These other constituents are excellent absorbers or emitters of IR and provide an advantageous method for making a compact heat and providing maximum temperature increase for the oxidant stream without requiring a larger recuperator. Mixed oxidant air-anode exhaust gas will autoignite when the temperature reaches about 590° C., i.e., $$H_2 + \tfrac{1}{2}O_2 \rightarrow H_2O$$

This provides additional temperature increase further reducing the required size of the heat exchangers.

As recuperator 30 is not a perfect black body, ducts (not shown) are provided in the SOFC stack 14 to effect secondary cooling of heat reflected back into the SOFC stack 14.

Preferably, heat flow into and out of SOFC stack 14 is controlled by selecting between exothermic and endothermic (i.e., partial oxidation and steam, respectively) reformation according to the power demand placed upon SOFC stack 14. For low or zero power demand from SOFC stack 14, partial oxidation reformation is utilized to keep SOFC stack 14 warm. Steam reformation is employed to remove heat from SOFC stack 14 during periods of high power demand. Selection of reformation based upon power demand thus ensures that the energy flow from the SOFC stack 14 system to the outside is essentially zero.

Figures 5, 6:
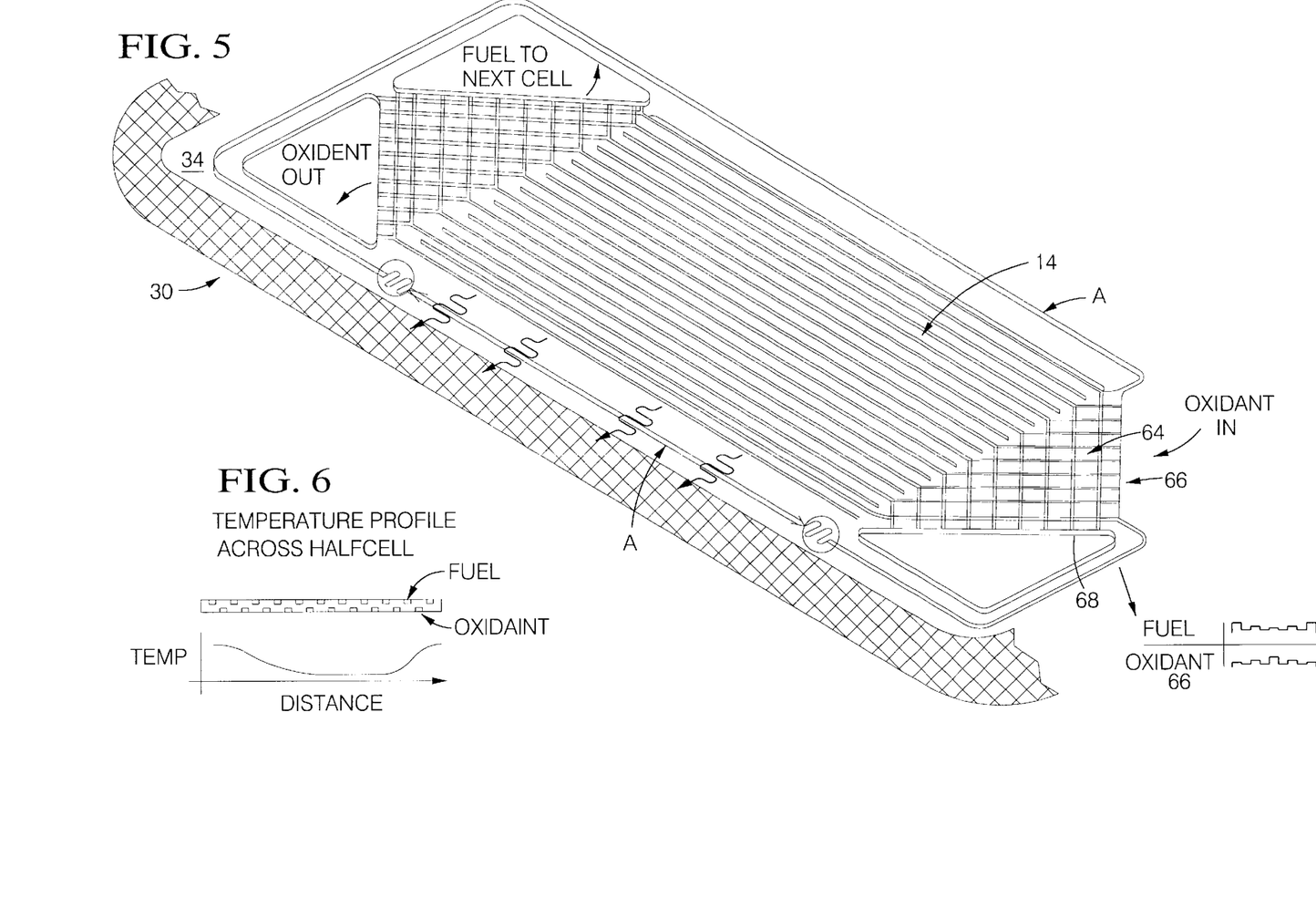
FIG. 5 is a depiction of the oxidant and fuel manifold channels of the present system configured to maximize fuel utilization near the recuperator walls.
FIG. 6 is a graphic depiction of a temperature profile achieved across a half-cell with the present system.

The air-fuel ratio is controlled by tailoring channel size, individual channel space velocity for the oxidant and fuel, and SOFC and reformer design. As shown in FIG. 5, the oxidant and fuel manifold channels 66 and 68, respectively, in the present system are configured to maximize fuel utilization near the recuperator 30 walls. The temperature profile across the half-cell, shown schematically in FIG. 6, ensures maximum heat transfer at the surface of the fuel cell stack 14. This enhances radiation transfer out of the fuel cell stack 14 to the recuperator 30 for enhanced thermal control. In another embodiment, a foam ceramic material may be tailored to achieve the desired temperature profile.

The fuel, i.e., gasoline, is a liquid at 25° C. and is preferably converted to a vapor and mixed with some oxygen before insertion into the recuperator at about 300° C. The mixture typically comprises an air-fuel ratio of about about 14.0 to about 14.4. Fuel vaporization may be accomplished in the mixed mode heat exchanger 20. Alternatively, fuel vaporization burners may be employed, but heating in this manner is intrinsically unstable, resulting in soot deposition. A preferred method employs an electrically heated cup disposed external to said recuperator 30 (for cold start evaporation) with air heated in channels in an electrically heated metal foil monolith (not shown) employing active feedback control. This electrically heated gasoline vaporizer provides a more stable system but still may produce soot during transients. This is known in the art as turn-down ratio. A most preferred method for oxygen insertion comprises using an oxygen permeable membrane permitting essentially absolute control of oxygen partial pressure without introducing nitrogen diluent.

Recuperator 30 provides a tailored anode fuel stream by functioning as a final portion of the gasoline reformer further optimizing efficient SOFC stack 14 performance. At least a portion of the fuel gas may be reformed external to the recuperator. In addition, at least a portion of the fuel gas may be reformed within the SOFC stack. The large positive temperature increase at the anode in the vicinity of fuel entry is exploited to reform fuel constituents converted via endothermic reactions. The conversion of gasoline into "ideal" anode fuel components also permits unique heat balance control to "couple" radiation to the gas stream enhancing heat exchanger efficiency; viz. create molecules including intermediates, with permanent dipole moments that absorb infrared radiation. This provides the advantage of lessening stress on the SOFC stack 14 components by limiting fast, large thermal excursions. For each application design with different hydrocarbon fuels, multiple catalyst stages and mixtures may be required to ensure a significant portion of anode reactions will be endothermic so as to utilize excess stack thermal energy. Thus, multiple catalyst zones (not shown) or mixtures of catalysts may be provided within the different temperature zones of the recuperator 30. Incoming fuel gas can be directed to a selected color graded area and catalyst zone of the recuperator 30 in accordance with reaction requirements.

In gasoline fueled applications, gasoline is converted in the recuperator 30 to reactive organic intermediates of small mass (viz. methane, ethylene, propene) that migrate to the high surface area anode (engineered with appropriate porosity, etc., for particular fuel input and power equirements) and attach to anode triple points (or near vicinity) and are converted there to $H_2$, CO, etc. in the presence of water according to the endothermic reaction $$CH_4 + H_2O \rightarrow 3H_2 + CO.$$

Figure 7:
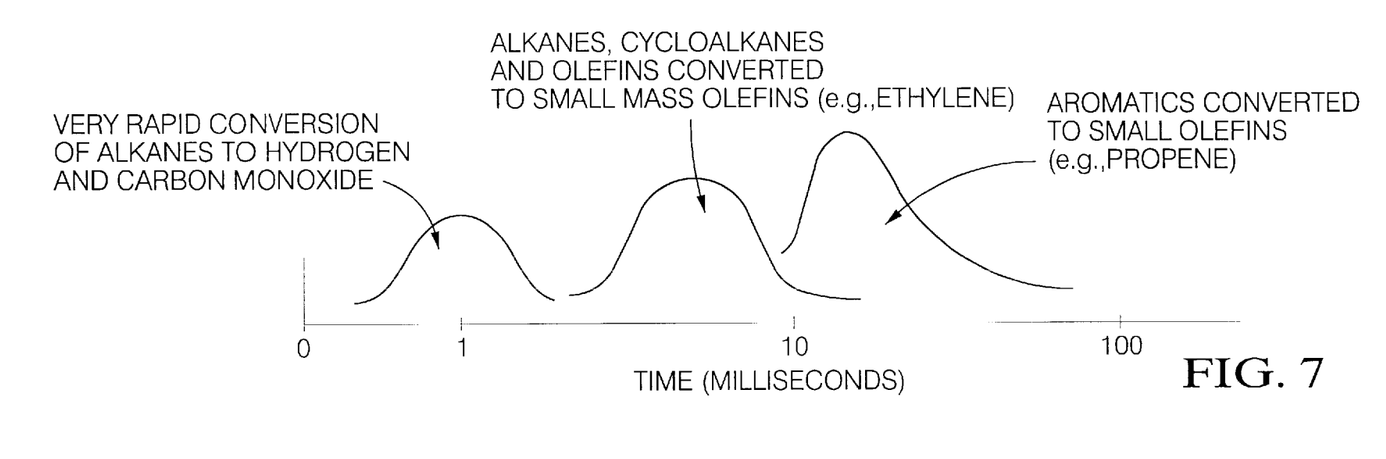
FIG. 7 is a graphic depiction of exemplary upstream timing reactions occurring within the reformer (recuperator) or along the SOFC manifold of the present system.
Figure 8:
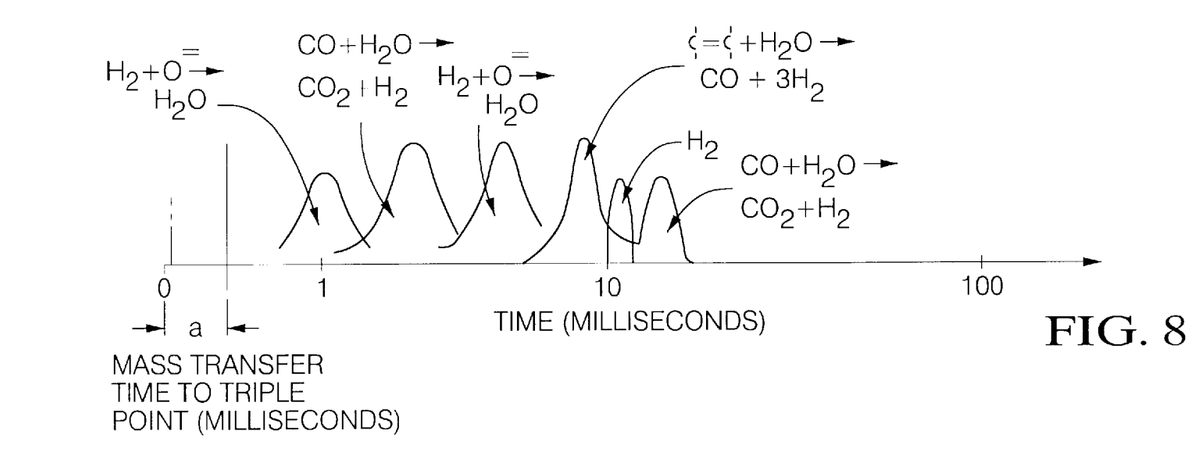
FIG. 8 is a graphic depiction of exemplary downstream timing reactions occurring at the anode of the present system.

FIG. 7 shows an example of upstream timing reactions occurring within the recuperator 30 or along the SOFC manifold 64. Exemplary downstream timing reactions are shown in FIG. 8. Recuperator 30 provides high conversion efficiency, low insertion of air ($N_2$ diluent) and "controlled" partial pressure of oxygen permitting either nickel-cermet (electrode) or more stable mixed metal oxide to remain a viable anode material. If desired, part of the reformer 30 may be located external to the adiabatic wall.

Figure 9:
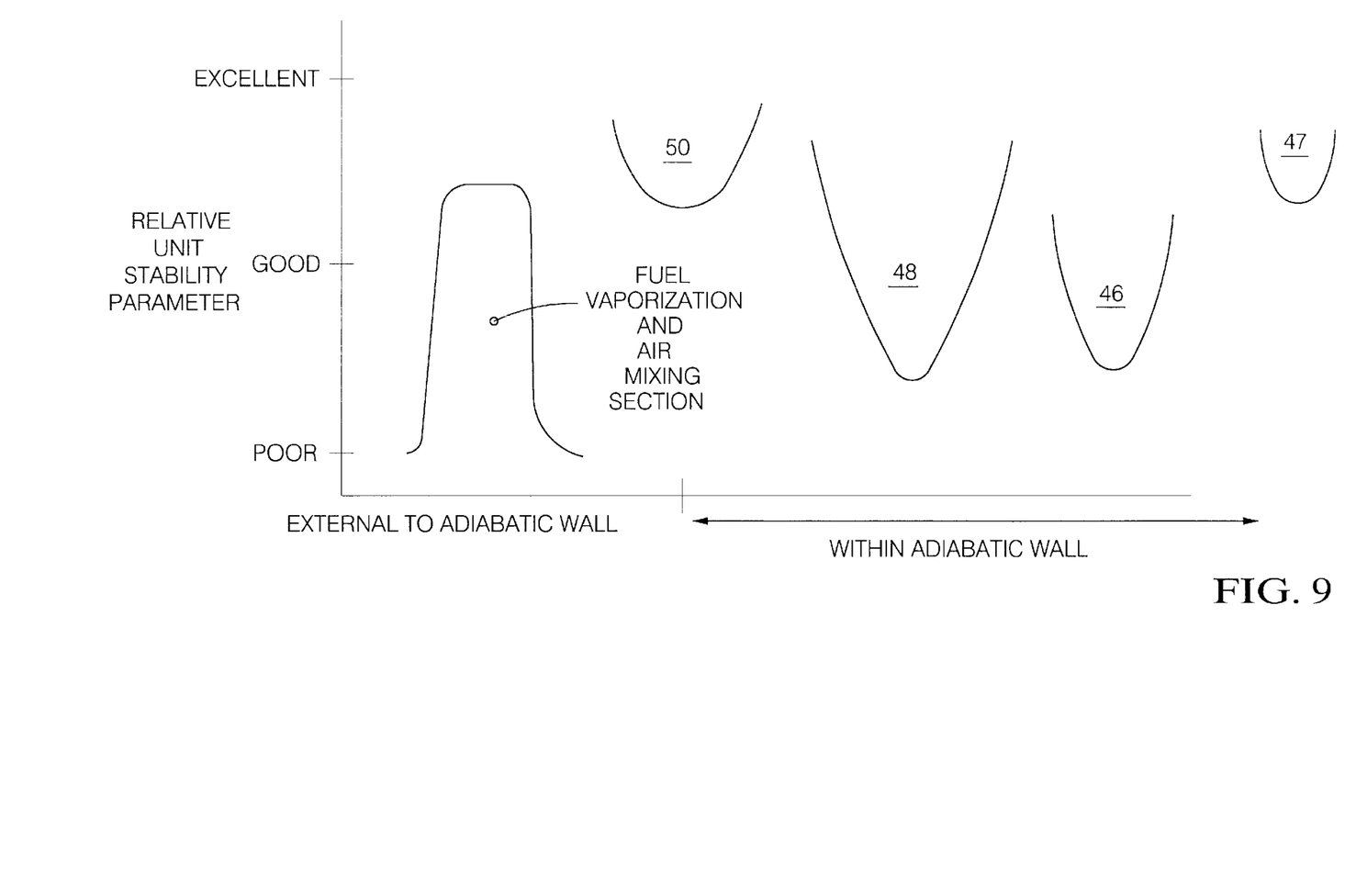
FIG. 9 is a graphic depiction showing the location of various reactions within and without the present system.

The present system provides the advantage of tailoring output by sequencing the release of fuel molecules (i.e., $H_2$ then CO then olefins) wherein formed anode $H_2O$ interacts in turn as substantially each molecule is formed. As illustrated in FIG. 9, large alkane conversion could be optimum in the "cooler" (i.e., about 400° C.) region 50 of the recuperator 30. Conversion of aromatics may occur in the warmer region 48 of the recuperator 30 (i.e., about 600–700° C.). Remaining hydrocarbons may be converted in the about 600 to about 850° C. temperature region 46. Methane is converted via the water shift reaction at anode triple points 47.

Recuperator 30 may also be used as part of a pyrolysis unit to enhance fast heat-up of the SOFC stack 14 upon cold start. This enables the SOFC stack 14 to achieve operational temperature (about 800° C.) with less input of energy (as compared with partial oxide systems heavily diluted with nitrogen). On cold start, the thermal catalytic cracking of gasoline produces a nearly pure stream of $H_2$, with carbon sequestered as soot. Once the SOFC system is operational, the system may be designed to switch to soot free zone to more energy efficient catalyst sequenced reformer technology. Soot clean up is then accomplished by cathode gas recirculation during pyrolysis by-pass. This produces an extra output of power (i.e., power surge), enabled by the nearly pure $H_2$ stream and the lack of $N_2$ dilution. Further, in transportation applications, the SOFC system's cold start capabilities enhance the ability to provide all or a majority of the tractive power.

Figure 10:
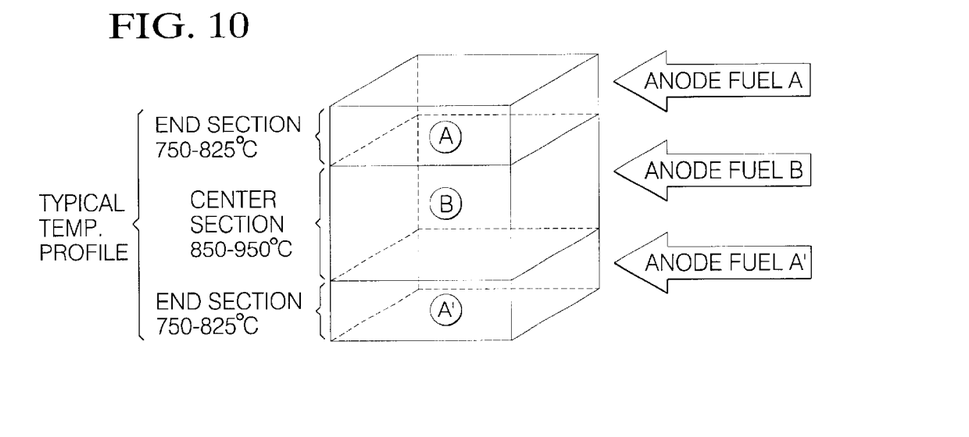
FIG. 10 is a simplified portrayal of the present system and method for controlling SOFC stack temperature by directing segregated anode fuel streams to selected SOFC stack sections.
Figure 11:
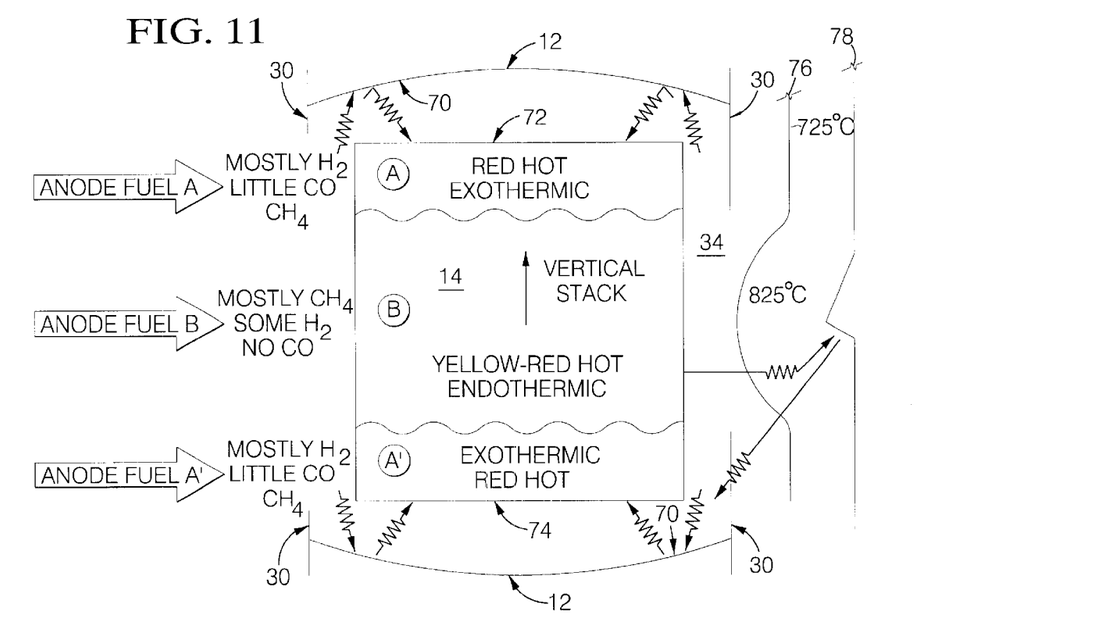
FIG. 11 is a partial cross-sectional view showing additional detail of the embodiment of FIG. 10.

A SOFC stack 14 temperature gradient in the direction of current flow and perpendicular to the fuel/oxidant gas flow is not conducive to efficient stack output since "cool" electrolyte layers are poorer electrical/oxygen ion conductors than "hot" electrolyte layers. The present system provides the further advantage of steady-state, uniform SOFC stack 14 temperature control (via the present heat balance engineering described above), thus enhancing overall system efficiency. FIGS. 10 and 11 provide simplified portrayals of the present system and method for controlling SOFC stack temperature. FIG. 10 shows the SOFC stack 14 divided into three sections comprising opposite end sections A, A' and center section B. Preferably, SOFC stack 14 sections A, A', B exhibit uniform temperatures of about 800±50° C.

Controlled heating of parallel piped SOFC stack 14 is accomplished by providing segregated specialized anode fuel streams A, B, and A' to sections A, B, A', respectively. Anode fuel streams A and A' are tailored to comprise $H_2$ with little CO or $CH_4$, the flux being determined by electrical power demands. Preferably, water content is limited to a few percent with minimal nitrogen diluent. The composition of anode fuel streams A, A' maximizes exothermic reactions with minimal interfering slow reactions.

Anode fuel stream B comprises primarily $CH_4$ with sufficient $H_2$ content to produce just enough water so that the water shift reaction for $CH_4$ occurs at a rate of about 90 to about 100%. The $CH_4$ reaction is highly endothermic and "consumes" an appreciable fraction of waste stack energy. Therefore, section B of SOFC stack 14 carries a large portion of the reforming load internally, thus optimizing thermal usage, providing nearly uniform stack temperature in the vertical direction, and improving overall stack efficiency. In a most preferred embodiment, the anode pore structure of section B is highly porous so as to optimize the removal of $H_2O$ (steam) flux from the anode-electrolyte interface.

Preferably, as shown in FIG. 11, reflective surfaces, such as very white surfaces, 70 are provided on selected curved inner sections of wall 12 for reflecting radiant energy (photons shown as jagged arrows) from the center section B of the SOFC stack 14 to the two opposite end sections A, A' of the SOFC stack 14. More preferably, a white planar zone 78 is provided on selected inner surfaces of wall 12 to further reflect radiant energy back into SOFC stack 14. The two end sections A, A' have dark gray or black walls 72, 74 for absorbing reflected radiant energy back into the SOFC stack 14. FIG. 10 provides typical temperature profile ranges, while an exemplary temperature profile 76 is shown in FIG. 11.

It will be understood that a person skilled in the art may make modifications to the preferred embodiments shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A compact integrated thermal management and fuel reformation system comprising:

a thermally insulated wall forming an envelope having an interior chamber for housing a solid oxide fuel cell stack;

said solid oxide fuel cell stack comprising a plurality of solid oxide fuel cells having oxidant and fuel inlets and arranged to permit fluid flow of incoming oxidant and fuel gases therebetween, and having an exhaust outlet;

a mixed mode heat exchanger disposed within said chamber for partially preheating an oxidant gas, said mixed mode heat exchanger having an oxidant gas inlet in fluid communication with a source of oxidant gas and an oxidant gas outlet;

a recuperator, disposed within said chamber and close coupled to said solid oxide fuel cell stack for absorbing radiation therefrom, for further heating incoming partially preheated oxidant gas and reforming incoming fuel gas, said recuperator having color graded interior walls providing a plurality of temperature zones and forming a positive temperature gradient in the direction of said solid oxide fuel cell stack, said recuperator having an oxidant inlet in fluid communication with said oxidant gas outlet of said mixed mode exchanger to receive partially preheated oxidant gas therefrom, an inlet in fluid communication with a fuel source to receive a flow of fuel; an oxidant outlet, a fuel gas outlet; and manifolds associated with said solid oxide fuel cell stack and in fluid communication with said oxidant and fuel gas outlets of said recuperator, said manifolds comprising oxidant and fuel channels for conducting fuel and heated oxidant from said recuperator to said solid oxide fuel cell oxidant and fuel inlets.

2. The system of claim 1, wherein said recuperator comprises an extruded monolith having bright white to medium gray to black color grading.

3. The system of claim 1, wherein said recuperator is formed from a ceramic slurry comprising inorganic pigments that are stable to high temperature, oxidizing and reducing environments.

4. The system of claim 1, wherein said manifold channels are arranged so as to maximize fuel flow near peripheral portions of each fuel cell and to maximize oxidant flow near central portions of each fuel cell.

5. The system of claim 1, wherein said manifold channels comprise a ceramic foam tailored to maximize fuel flow near peripheral portions of each fuel cell and to maximize oxidant flow near central portions of each fuel cell.

6. The system of claim 1, wherein said thermally insulated wall, mixed mode heat exchanger, and recuperator are arranged so as to effect a positive temperature gradient in the direction of said solid oxide fuel cell stack.

7. The system of claim 1, comprising ceramic blankets disposed on said recuperator.

8. The system of claim 7, wherein said ceramic blankets comprise cordierite, mullite, silicon carbide, or a combination thereof.

9. The system of claim 1, wherein said envelope is cylindrical.

10. The system of claim 1, wherein said wall and said mixed mode heat exchanger is formed by a super plastic forming process.

11. The system of claim 1, comprising an intumescent polymeric fire shield disposed adjacent said wall.

12. The system of claim 1, further comprising:
a reflective layer provided on an interior wall of said mixed mode heat exchanger.

13. The system of claim 1, wherein said incoming fuel gas comprises solid oxide fuel cell exhaust that is recirculated to said recuperator.

14. The system of claim 1, wherein said solid oxide fuel cell stack further comprises auxiliary cooling ducts.

15. The system of claim 1, further comprising:
an electrically heated gasoline vaporizer, an electrically heated monolith duct for heating oxidant, an oxygen permeable membrane for controlling oxygen partial pressure, or a combination thereof.

16. The system of claim 1, wherein said recuperator further comprises multiple catalyst zones, mixtures of catalysts, or a combination thereof.

17. The system of claim 1, wherein portions of interior surfaces of said wall forming said envelope comprise reflective surfaces.

18. The system of claim 1, wherein said solid oxide fuel cell stack comprises end sections disposed at opposite ends of said stack and a center section disposed between said end sections, and wherein said end sections comprise radiant energy absorbing walls.

19. The system of claim 1, wherein said solid oxide fuel cell stack comprises end sections disposed at opposite ends of said stack and a center section disposed between said end sections, and wherein anodes within said center section comprise a pore structure having a porosity sufficient to optimize removal of $H_2O$ from anode-electrolyte interfaces.

20. A method for providing a tailored anode fuel stream for a solid oxide fuel cell system comprising:
arranging a solid oxide fuel cell stack comprising a plurality of solid oxide fuel cells in fluid communication with a recuperator within an insulated housing, said recuperator having color graded interior walls providing a plurality of temperature zones that form a positive temperature gradient in the direction of said solid oxide fuel cell stack;
introducing a flow of fuel gas into said recuperator;
exposing the recuperator to radiation from said solid oxide fuel cell stack;
exchanging heat from said solid oxide fuel cell stack into the flow of fuel gas;
reforming said fuel gas into a tailored anode fuel stream;
directing said tailored anode fuel stream to anodes of said solid oxide fuel cells.

21. The method of claim 20, wherein said directing is through channels arranged so as to maximize fuel utilization at portions of each fuel cell adjacent said recuperator.

22. The method of claim 20, wherein said method further comprises flowing exhaust from said solid oxide fuel cell stack into said recuperator.

23. The method of claim 20, wherein said fuel gas is gasoline and said reforming is thermal catalytic cracking of said gasoline.

24. The method of claim 23, further comprising:
recirculating cathode exhaust to substantially remove carbon from said recuperator.

25. The method of claim 20, further comprising:
providing multiple catalyst zones, mixtures of catalysts, or a combination thereof, within said temperature zones.

26. The method of claim 20, further comprising:
directing segregated, specialized anode fuel streams into said solid oxide fuel cell stack.

27. The method of claim 20, further comprising:
reforming at least a portion of said fuel gas external to said recuperator.

28. The method of claim 27, further comprising:
reforming at least a portion of said fuel gas within said SOFC stack.

29. The method of claim 20, further comprising:
selecting between endothermic and exothermic reforming to control heat flow into and out of said SOFC stack.

30. A hybrid electric powertrain employing a solid oxide fuel cell system having a compact integrated thermal management and fuel reformation system characterized by:
a thermally insulated wall forming an envelope having an interior chamber for housing a solid oxide fuel cell stack;
said solid oxide fuel cell stack comprising a plurality of solid oxide fuel cells having oxidant and fuel inlets and arranged to permit fluid flow of incoming oxidant and fuel gases therebetween, and having an exhaust outlet;
a mixed mode heat exchanger disposed within said chamber for partially preheating an oxidant gas, said mixed mode heat exchanger having an oxidant gas inlet in fluid communication with a source of oxidant gas and an oxidant gas outlet;
a recuperator, disposed within said chamber and close coupled to said solid oxide fuel cell stack for absorbing radiation therefrom, for further heating incoming partially preheated oxidant gas and reforming incoming fuel gas,
said recuperator having interior walls that are color graded to effect a plurality of temperature zones forming a positive temperature gradient in the direction of said solid oxide fuel cell stack and comprising multiple catalyst zones, mixtures of catalysts, or a combination thereof; said recuperator having an oxidant inlet in fluid communication with said oxidant gas outlet of said mixed mode exchanger to receive partially preheated oxidant gas therefrom, an inlet in fluid communication with a fuel source to receive a flow of fuel; an oxidant outlet, a fuel gas outlet; and
manifolds associated with said solid oxide fuel cell stack and in fluid communication with said oxidant and fuel gas outlets of said recuperator, said manifolds comprising oxidant and fuel channels for conducting reformed fuel and heated oxidant from said recuperator to said solid oxide fuel cell oxidant and fuel inlets, wherein said manifold channels are arranged so as to maximize fuel flow near peripheral portions of each fuel cell and to maximize oxidant flow near central portions of each fuel cell.

31. The system of claim 30, wherein said recuperator comprises an extruded monolith formed from a ceramic slurry comprising inorganic pigments that are stable to high temperature, oxidizing and reducing environments.

32. The system of claim 30, comprising an intumescent polymeric fire shield disposed adjacent said wall.

33. The system of claim 30, further comprising an electrically heated gasoline vaporizer, an electrically heated monolith duct for heating oxidant, an oxygen permeable membrane for controlling oxygen partial pressure, or a combination thereof.

34. A reformer comprising:

a recuperator, for heating and reforming incoming fuel gas, having a fuel inlet in fluid communication with a fuel source and an outlet for emitting a stream of reformed fuel;

said recuperator having interior walls that are color graded to effect a plurality of temperature zones forming a positive temperature gradient in the direction of said outlet.

35. The reformer of claim 34, wherein said recuperator comprises an extruded monolith having bright white to medium gray to black color grading.

36. The reformer of claim 34, wherein said recuperator is formed from an extruded ceramic slurry comprising inorganic pigments that are stable to high temperature, oxidizing and reducing environments.

37. The reformer of claim 34, wherein selected portions of said recuperator have ceramic blankets disposed thereon.

38. The reformer of claim 34, wherein said incoming fuel gas comprises solid oxide fuel cell exhaust.

39. The reformer of claim 34, further comprising:

mixtures of catalysts, multiple catalyst zones, or a combination thereof; wherein said fuel gas inlet is further arranged so as to direct said incoming fuel gas to a selected catalyst zone.

40. The reformer of claim 34, wherein said reformer is arranged so as to produce segregated tailored anode fuel streams.

* * * * *